(No Model.)
C. H. WAKEFIELD.
FOOT GUARD FOR FROGS, SWITCHES, &c.
No. 402,209. Patented Apr. 30, 1889.
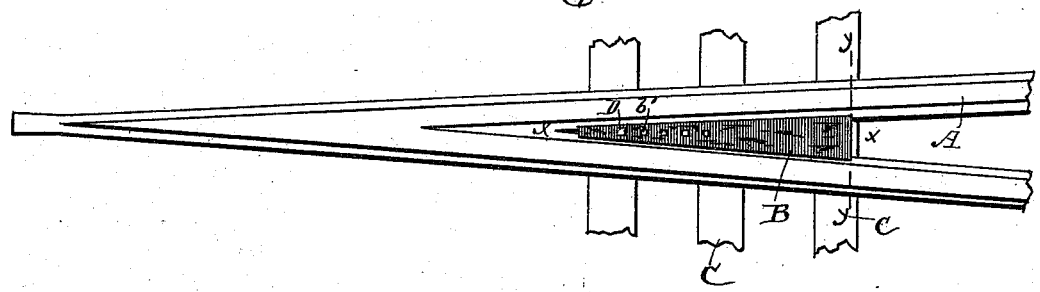
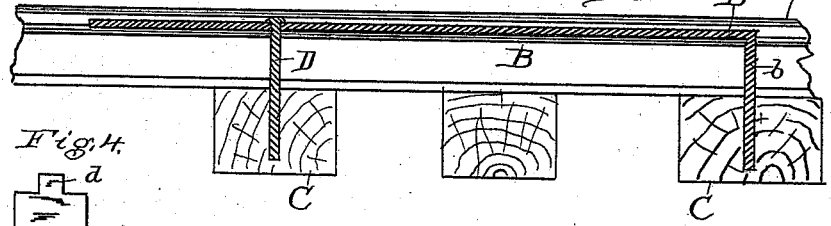
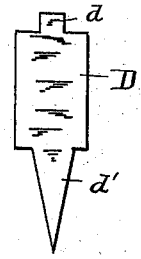
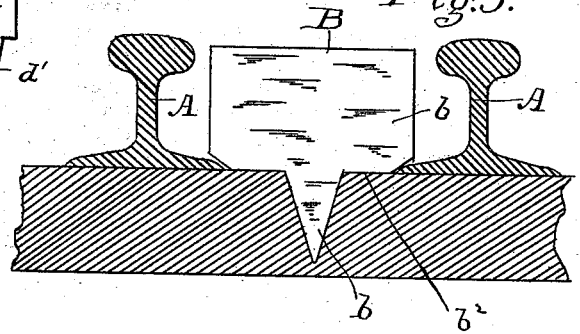
Witnesses:
John F. Libby.
Charles S. Cook.
Inventor:
Charles H. Wakefield
by S. W. Bates atty.

UNITED STATES PATENT OFFICE.

CHARLES H. WAKEFIELD, OF SHERBROOKE, QUEBEC, CANADA.

FOOT-GUARD FOR FROGS, SWITCHES, &c.

SPECIFICATION forming part of Letters Patent No. 402,209, dated April 30, 1889.

Application filed August 20, 1888. Serial No. 283,254. (No model.)

*To all whom it may concern:*

Be it known that I, CHARLES H. WAKEFIELD, a citizen of the United States, residing at Sherbrooke, in the county of Sherbrooke and Province of Quebec, Canada, have invented certain new and useful Improvements in Foot-Guards for Frogs, Switches, &c.; and I do hereby declare the following to be a full, clear, and exact description of the invention, such as will enable others skilled in the art to which it appertains to make and use the same.

My invention relates to foot-guards for frogs, switches, and other angular openings in railroad-tracks.

Many accidents have occurred by the catching of the feet of brakemen and others in such angular openings; and the object of my invention is to provide a cheaply-made and effective device for filling such spaces to prevent such accidents.

My invention consists of a foot-guard composed of a tapering plate having its larger end turned down and formed to be driven into the tie and having near the smaller end one or more holes, combined with a spike having its upper end adapted to be riveted in one of said holes for the purpose of supporting said smaller end.

In the accompanying drawings I illustrate a foot-guard which embodies my invention.

In the drawings, Figure 1 is a plan view of my foot-guard in place at a frog. Fig. 2 is an enlarged section through the line $x\,x$ of Fig. 1. Fig. 3 is an enlarged view on the line $y\,y$ of Fig. 1. Fig. 4 is a detail of spike.

A represents a frog of ordinary construction, which I here use to illustrate the manner of applying my invention, although it is evident that it can be used in any tapering space between rails.

B is my guard, which consists of a tapering piece of metal, preferably iron, the larger end, $b$, turned down at right angles, or nearly so, and pointed in such a manner as to be driven into the tie. A shoulder, $b^2$, is formed to limit the depth to which the end can be driven into the wood of the tie. A number of holes, $b'$, are formed in the guard near the smaller end, this line of holes extending over a space greater than the distance between the ties, so that one of them will always come over a tie.

A spike, D, is provided for the purpose of supporting the smaller end of the guard. This spike has at its upper end a tongue, $d$, adapted to fit the holes $b'$ of the guard and to extend through the same sufficiently far to be riveted on the upper side. On the lower end of the spike I preferably form a shoulder to limit the extent to which it may enter the tie. The guard is placed in position by driving the large end into a tie at a suitable point, passing the head of the spike D through one of the holes $b'$, which comes over a tie, driving the spike into the tie, and riveting the head of the spike in place. The length, width, and the taper of the guard are to be adapted to the position in which it is used, although it is not necessary to have each guard fit exactly, as one size will fit a variety of angles. It is only necessary that the guard shall fill the space so that no opening is left large enough to allow the foot to enter.

The height of the upper surface of the guard is governed by the position of the shoulder $b^2$ and the shoulder on the spike D. As here shown, the upper surface of the guard is approximately on a level with the top of the rail; but when placed where the flanges of the wheels pass over it it may be made lower, so that it just clears the edge of the flange, or it may be made level with the top of the rail, as here shown, with a space between its edge and the edge of the rail for the flange of the car-wheel to pass through.

A guard constructed as here shown has the advantage of cheapness and simplicity, it can be readily placed in position without special adjustment, and it will remain in place without liability of being displaced.

By making a few different sizes of guards I will be able, as pointed out, to fit the many places on a railroad where they are needed.

I claim—

1. The herein-described foot-guard for railway frogs, switches, &c., consisting of a tapering bar having the larger end turned down and formed to adapt it to be driven into the tie, and having one or more holes through it, in combination with a spike having its upper end formed to fit said holes, substantially as described.

2. The herein-described foot-guard for railway frogs, switches, &c., consisting of a tapering bar having the larger end turned down and formed to be driven into the tie, a shoulder on said turned-down end to limit its entrance into said tie, and one or more holes in said bar, in combination with a spike to fit said holes and to support the small end of said bar, substantially as described.

3. The herein-described foot-guard for railway frogs, switches, &c., consisting of a tapering bar having its larger end turned down and formed to be driven into the tie, a shoulder on said turned-down end to limit its entrance into the tie, and a series of holes in said bar, in combination with a spike for supporting the smaller end, having a tongue at its upper end adapted to fit said holes and a shoulder to limit its entrance into the tie, substantially as described.

In testimony whereof I affix my signature in presence of two witnesses.

CHARLES H. WAKEFIELD.

Witnesses:
S. W. BATES,
JAS. COOK.